United States Patent
Kurata

(10) Patent No.: US 8,939,495 B2
(45) Date of Patent: Jan. 27, 2015

(54) SPOILER STRUCTURE

(71) Applicant: Nihon Plast Co., Ltd., Shizuoka (JP)

(72) Inventor: Takenori Kurata, Shizuoka (JP)

(73) Assignee: Nihon Plast Co., Ltd., Shizuoka (JP)

( * ) Notice: Subject to any disclaimer, the term of this patent is extended or adjusted under 35 U.S.C. 154(b) by 0 days.

(21) Appl. No.: 14/052,329

(22) Filed: Oct. 11, 2013

(65) Prior Publication Data
US 2014/0117710 A1 May 1, 2014

(30) Foreign Application Priority Data
Oct. 26, 2012 (JP) ................................ 2012-236485

(51) Int. Cl.
*B62D 35/00* (2006.01)

(52) U.S. Cl.
CPC ...................................... *B62D 35/00* (2013.01)
USPC ...................................... 296/180.1; 180/68.1

(58) Field of Classification Search
CPC ....................................................... B62D 35/00
USPC ........... 296/180.1; 29/428; 180/68.1; 285/60; 293/120.154, 102
See application file for complete search history.

(56) References Cited

U.S. PATENT DOCUMENTS

| 3,973,064 | A | 8/1976 | Paine |
| 4,722,560 | A | 2/1988 | Guest |
| 2012/0013147 | A1 | 1/2012 | Ezaka |
| 2012/0061992 | A1 | 3/2012 | Ezaka |

FOREIGN PATENT DOCUMENTS

| EP | 2 236 836 A2 | | 10/2010 |
| JP | 07010047 A | * | 1/1995 |
| JP | 2004-106765 A | | 4/2004 |
| JP | 2010-064671 A | | 3/2010 |
| JP | 2010-208058 A | | 9/2010 |
| JP | 2010274821 A | * | 12/2010 |
| JP | 2012-061897 A | | 3/2012 |

OTHER PUBLICATIONS

Search Report, GB Patent Application No. GB1319035.0 dated Apr. 11, 2014.

* cited by examiner

*Primary Examiner* — Pinel Romain
(74) *Attorney, Agent, or Firm* — Arent Fox LLP

(57) ABSTRACT

A spoiler where when a weld face is inclined with respect to a pressurization direction, a weld rib is uniformly welded, and an outer member and an inner member are welded and fixed to each other at a stable strength. An inner member is welded and fixed to on an interior face side of an outer member by a vibration welding method. The outer member and/or the inner member before being welded has a weld rib formed on a face inclined with respect to a pressurization direction at the time of welding; a cross section of the rib is formed in a triangular or quadrangular shape; and in the cross section, two corners at both ends of a bottom edge each form an angle of 90 degrees or less.

6 Claims, 8 Drawing Sheets

(A)

(A)

SPOILER STRUCTURE

CROSS REFERENCE TO RELATED APPLICATIONS

This application claims priority of Japanese Patent Application No. 2012-236485 filed on Oct. 26, 2012. The contents of this application are incorporated herein by reference in their entirety.

BACKGROUND OF THE INVENTION

1. Field of the Invention

The present invention relates to a spoiler in which an outer member and an inner member that are made of a synthetic resin are welded and fixed and then are integrated with each other.

2. Description of the Related Art

A variety of spoilers are employed for the purpose of improvement in steering property or in travelling stability of an automobile. For example, a front spoiler has an advantageous effect of restraining inflow of air to a lower face of a vehicle body to thereby restrain an occurrence of a lifting force, and a side spoiler effectively has an advantageous effect of feeding the air flowing to both sides of the vehicle to thereby restrain an occurrence of an eddy on the rear side of the vehicle body.

These spoilers each are generally composed of an outer member and an inner member that are made of a synthetic resin, and the outer member and the inner member are integrated with each other by a variety of means. The outer member is a member that serves as an external view of a spoiler in the case where the spoiler is mounted on the vehicle body, and the inner member is a member that is positioned at an interior face side of the outer member, and that is used to be mounted on the vehicle body.

A vibration welding method is known as one of methods for integrating an outer member and an inner member with each other (for example, Japanese Unexamined Patent Application Publication No. 2012-061897). The vibration welding method is a method for arranging and pressurizing an outer member and an inner member in their coupled state and then vibrating and thermally welding one of these two members in a direction vertical to a pressurization direction. In order to thermally weld both of the members, a weld rib is formed at a part at which the outer member and the inner member come into contact with each other. As described previously, in a state in which the weld rib is welded due to a heat of the pressurization and vibration, the rib is fixed at its predetermined position and then the rib is cooled to thereby cause the outer member and the inner member to be integrated with each other in their coupled state.

While the weld rib is welded due to a frictional heat with a contact part of the outer member or the inner member, in the case where a weld rib is formed on a face inclined with respect to the pressurization direction, a contact area becomes larger than a vertical face. Thus, in the case of a conventional substantially hemispherical weld rib as shown in FIG. 7, there has been a problem that a timing at which the weld rib starts welding is likely to shift depending on a location. Further, if part of the weld rib starts welding, a contact area with a counterpart member suddenly increases and therefore there has been a problem that a stable welding quality of the whole product is hardly assured.

In view of the problem described above, the present invention aims to provide a spoiler in which even in the case where a weld face is inclined with respect to a pressurization direction, a weld rib is uniformly welded and then an outer member and an inner member are welded and fixed to each other at a stable strength, the spoiler having an excellent welding quality of its whole product.

SUMMARY OF THE INVENTION

In order to solve the above described problem, the Inventor studied that a sectional shape of a weld rib was formed in a triangular shape. As long as the sectional shape of the weld rib is in a triangular shape, if face to be welded with respect to the pressurization direction at the time of vibration welding is inclined (on the order of 45 degrees, for example), a contact area between a tip end part of the weld rib (an apex part of a triangle) and a counterpart member becomes very small. Thus, it becomes possible to uniform a timing at which the weld rib starts welding. Further, after the weld rib has started welding as well, the contact area between the weld rib and the counterpart member gradually increases and thus a uniform welding force can be stably obtained.

In addition, the Inventor studied that the face on which the weld rib was formed and the pressurization direction were not vertical to each other, and therefore, as shown in FIG. 6, a shape is formed such that a corner of one of both ends of a bottom edge exceeds an angle of 90 degrees (in other words, the shape of an obtuse triangle). In this manner, the Inventor studied that a tip end of the weld rib serves as a block with respect to a forwarding direction (a pressurization direction) of the counterpart member so that a greater pressure is applied to the weld rib.

However, in the case where a weld rib is formed in such a shape that the cross section as described above is in the shape of an obtuse triangle, there has been found out a problem that the weld rib cannot bear against a force in a direction of a face on which the weld rib is formed from an apex of the weld rib (a component of the force that is applied to the weld rib) and then the weld rib falls down before the weld rib is completely welded. Further in this case, at least a tip end part of the weld rib is welded and therefore the outer member and the inner member seem to be welded and integrated with each other after all works have completed. However, as described previously, the weld rib falls down before the weld rib is completely welded and therefore it has found that there exists a part at which welding is not sufficient, and uniform welding is not obtained.

In the case described above, while it is considered to additionally check whether or not both of the members are welded sufficiently well and then re-collect only acceptable items, there has been a problem that in this case the number of unnecessary steps increases, resulting in an increase in cost.

Therefore, the Inventor actively made a further study with respect to the shape of a weld rib that is capable of obtaining a uniform and sufficiently stable strength even in the case where a weld face is inclined with respect to the pressurization direction. As a result, the Inventor found out that it is effective to form a weld rib so that a cross section of the weld rib is formed in a triangular or quadrangular shape and that two corners at both ends of a bottom edge in the weld rib each form an angle of 90 degrees or less, and achieved the present invention.

The weld rib is formed in the inner member before welded and fixed and a width of a part in which the weld rib after welded and fixed is in contact with a back face of the outer member is ½ or less of a thickness of the outer member.

According to the present invention, there can be provided a spoiler in which even in the case where a weld face is inclined with respect to a pressurization direction, a weld rib is uniformly welded and then an outer member and an inner member are welded and fixed to each other at a stable strength, the spoiler having an excellent welding quality of its whole product.

BRIEF DESCRIPTION OF THE DRAWINGS

FIG. 4 (B) is an enlarged view illustrating a state after welding and fixing of the X part of FIG. 3;

DESCRIPTION OF THE PREFERRED EMBODIMENTS

As described above, a spoiler according to the present invention is a spoiler in which an inner member is welded and fixed on an interior face side of an outer member by means of a vibration welding method, the spoiler characterized in that in the outer member and/or the inner member before being welded and fixed; a weld rib is formed on a face that is inclined with respect to a pressurization direction at the time of vibration welding; a cross section of the weld rib is formed in a triangular or quadrangular shape; and in the weld rib, two corners at both ends of a bottom edge each form an angle of 90 degrees or less.

Figure 1:
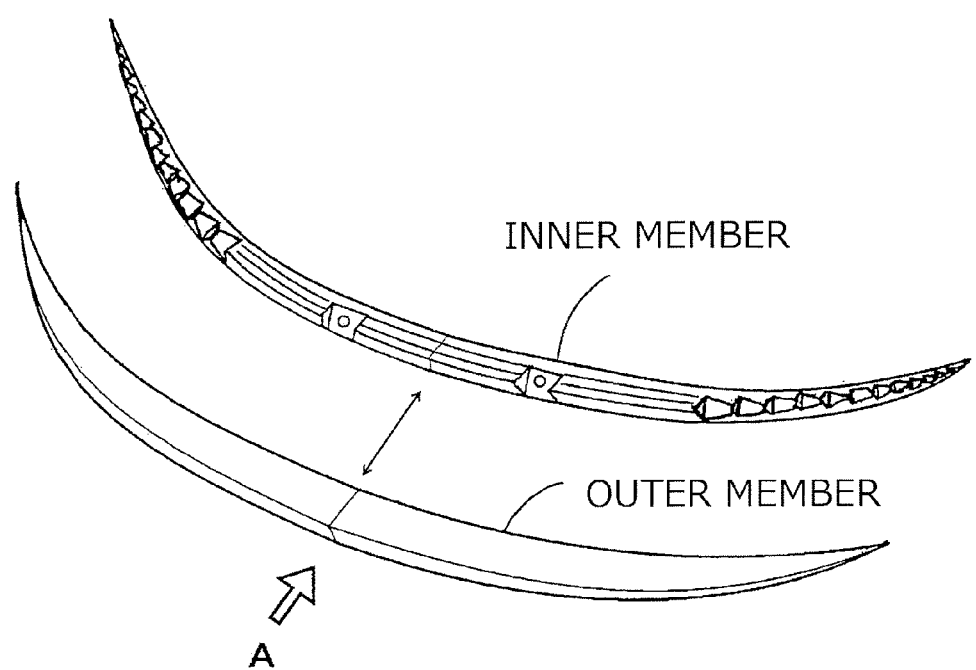
FIG. 1 is a view illustrating one example of a structure of an outer member and an inner member in a spoiler of the present invention.

Hereinafter, the present invention will be described in more detail with reference to the drawings. As shown in FIG. 1, a spoiler of the present invention is made of an outer member and an inner member, the inner member is adapted to enter and come into contact with an interior face side of the outer member, and in this state, pressurization and vibration are applied to thereby vibrate, weld, and integrate both of the members with each other. In an example of FIG. 1, a cross section of the spoiler is formed in a V-shape, and a weld face between the outer member and the inner member is inclined in the order of 45 degrees with respect to the pressurization direction at the time of vibration welding. On a surface of an inner member before integrated, a weld rib of which a cross section is formed in a triangular shape is provided, and a contact part at a tip end of the weld rib is edged.

Figure 2:
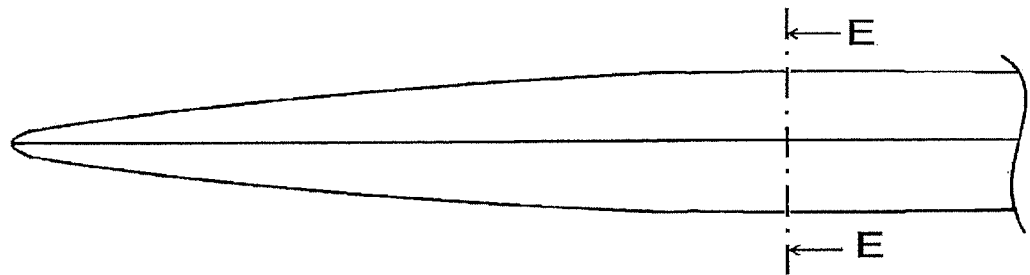
FIG. 2 is a view when the spoiler illustrated in FIG. 1 is seen in an A direction.

FIG. 2 is a view of a spoiler in which an outer member and an inner member are integrated with each other when the spoiler is seen from an exterior face part (the arrow A of FIG. 1). In addition, FIG. 3 shows a sectional view taken along the line E-E of FIG. 2.

Figure 3:
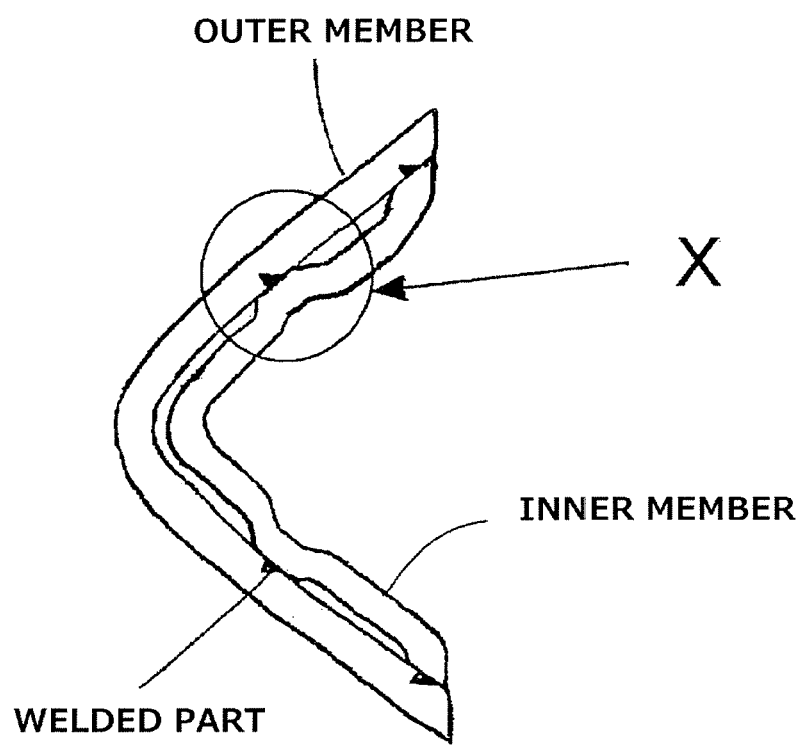
FIG. 3 is a sectional view taken along the line E-E of the spoiler illustrated in FIG. 2.

As shown in FIG. 3, the inner member is welded and fixed in a state in which the inner member enters the interior face side of the outer member. In FIG. 3, a part at which the outer member and the inner member come into contact with each other is a welded part. Welding and fixing is carried out by means of vibration welding. Vibration welding is carried out by applying a pressure in a horizontal direction to each of the outer member and the inner member so that the outer member and the inner member come into contact with each other and further applying a vibration in a direction orthogonal to a paper face. Vibration may be carried out in a condition that its related amplitude is on the order of 1.5 mm to 4.0 mm and the vibration frequency is on the order of 100 Hz to 240 Hz.

By means of the pressure and vibration described above, a tip end of the weld rib is welded due to a frictional heat with a counterpart member, and in this state, both of the members are fixed to each other at a predetermined position and then the fixed members are cooled so as to thereby able to be integrated with each other. It is to be noted that while in FIG. 3, it is illustrated as if the weld rib formed in the inner member were pushed into an interior face of the outer member, this is conveniently shown in order to clarify a position at which the weld rib has been formed, and in actuality, the weld rib is welded as described previously.

Figure 4:
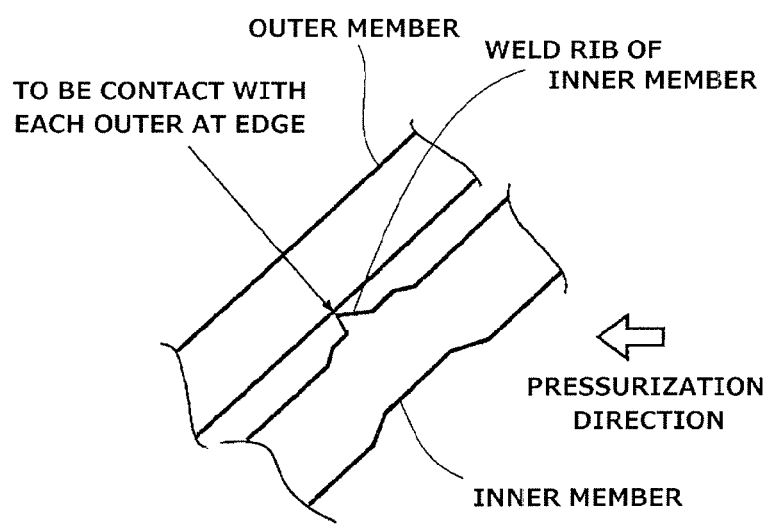
FIG. 4 (A) is an enlarged view illustrating a state before welding and fixing of an X part of FIG. 3.
Figure 4:
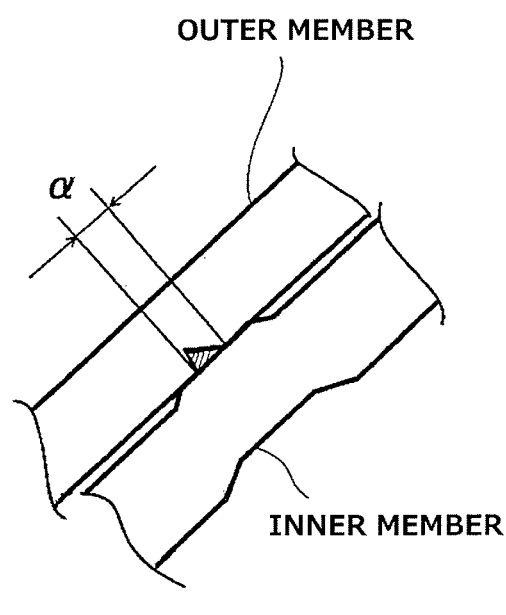

FIG. 4 shows an enlarged view of a part X at which weld ribs before vibration welding and after vibration welding have been formed. In an example shown in the enlarged view (A) before vibration welding of FIG. 4, an outer member and an inner member before vibration welding come into contact with each other at a tip end part of the weld rib that is formed in the inner member, and a pressure is applied in a direction in which both of the members come into contact with each other. The weld rib is formed on a face that is inclined with respect to the pressurization direction at the time of vibration welding. It is to be noted that the weld rib may be formed on the at least inclined face, or alternatively, may be formed on a face that is orthogonal to the pressurization direction at the time of vibration welding (such as a tip end part of the inner member).

The weld rib of which a sectional shape is formed in a triangular or quadrangular shape comes into contact with a counterpart member at only one point of its apex, and therefore, if a pressure and a vibration is applied, the weld rib gradually starts welding from its tip end part due to its related frictional heat. Thus, the weld rib in the present invention comes into linear contact with the counterpart member and its related contact area is very small, and therefore, it becomes possible to uniform a timing at which the weld rib starts welding in comparison with a conventional weld rib having its large contact area.

Further, the weld rib is characterized in that, two corners at both ends of a bottom edge of a triangle or quadrangle each form an angle of 90 degrees or less. The weld rib is formed in such a shape, whereby as described previously, even if a pressure is applied therebetween in a state in which the weld rib and the counterpart member come into linear contact with each other, the weld rib does not fall down. In this manner, the weld rib is uniformly welded, and an appropriate welding force can be obtained. It is to be noted that the bottom edge of the weld rib means two corners opposed to an apex which is designated as a part in a cross section of the weld rib in a triangular or quadrangular shape, the part coming in contact with the counterpart member.

Figure 6:
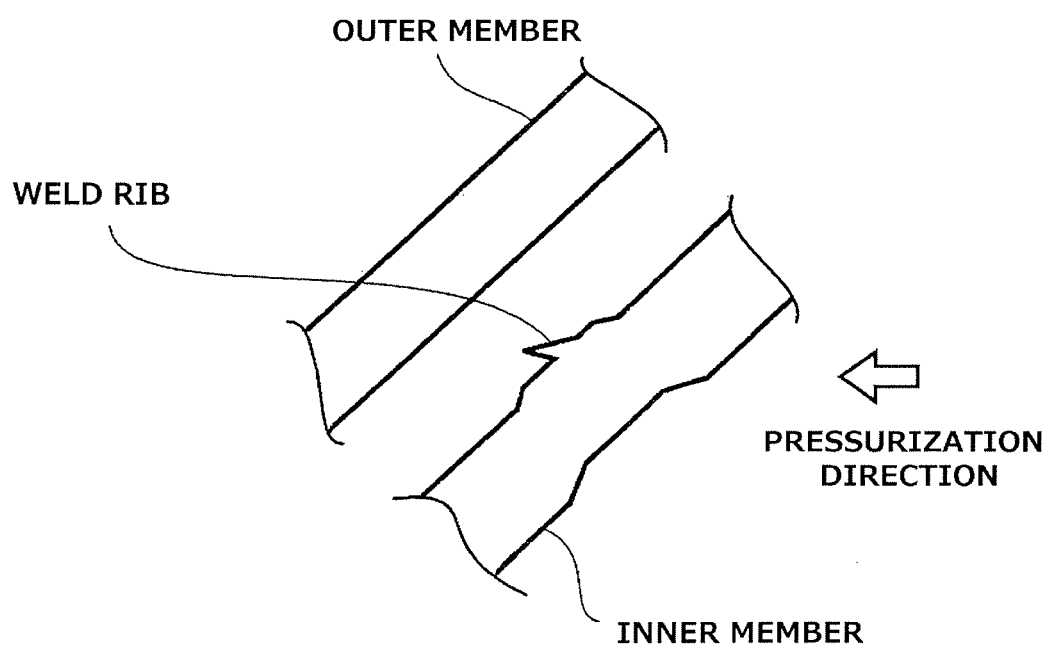
FIG. 6 is a view illustrating a shape of a weld rib in a reference example of the present invention.
Figure 7:
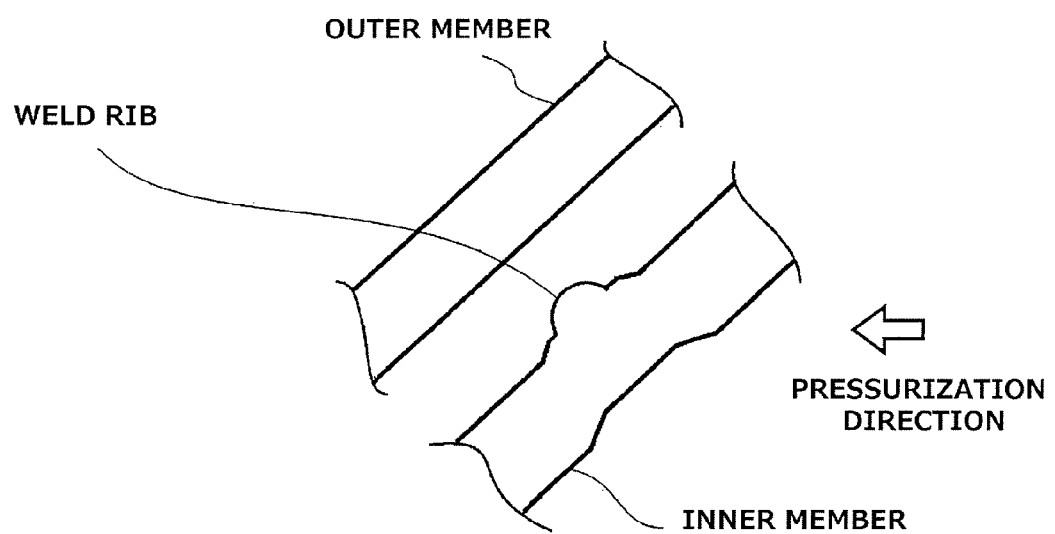
FIG. 7 is a view illustrating a shape of a weld rib for fabricating a conventional spoiler.

In the triangular shape of the cross section, if either one of the corners at both ends of the bottom edge exceeds an angle of 90 degrees, the shape of weld rib becomes such a shape that a support exerted by the weld rib does not exist between an apex of the triangle and the face on which the weld rib is formed (refer to FIG. 6). Thus, if a force in a planar direction in which the weld rib is formed (a component of the force that is applied to the inner member) is applied to the apex of the triangle, a force of supporting an apex part of the triangle is very weak, and therefore, there has been a problem that the weld rib falls down.

On the other hand, the weld rib in the present invention is characterized in that in the weld rib, two corners at both ends of the bottom edge of the triangle or quadrangle each form an angle of 90 degrees or less, and therefore, the apex part is firmly supported. Thus, even if a force is applied from the apex of to the face on which the weld rib is formed from the apex of the triangle, the apex part of the triangle does not fall down, and therefore, the vibration welding method can be appropriately carried out.

In other words, if the outer member and the inner member are vibrated in a state in which these two members are pressurized in the pressurization direction, an edge part of the apex of the weld rib of the inner member comes into contact with a back face of the outer member and then a load concentrates on the edge part at the tip end of the weld rib. In this manner, the edge part at the tip end of the weld rib is heated and enters a state in which the edge part is prone to weld with the outer member, and even on a face from which a pressure inclined with respect to the pressurization direction is likely to escape, stable welding becomes possible. Further, the weld rib is firmly supported with respect to a direction in which the weld rib falls down as well, and the weld rib does not fall down partway, making it possible to perform uniform welding.

In the example described above, while a description has been given with respect to a case in which the weld rib is formed in the inner member, the weld rib may be provided in either one of the outer member and the inner member, or alternatively, may be provided in each of these two members. In addition, while a description has been given with respect to a case in which a cross section of the weld rib before welded and fixed is formed in the triangular shape, the cross section of the weld rib may be formed in a triangular shape with a curved apex or a quadrangular shape obtained by cutting an apex of the triangular shape.

In addition, in the case where the weld rib is formed in the inner member, if a length of a bottom edge is too large in the triangular shape of the cross section of the weld rib, the outer member shrinks afterwards, and a shrink may occur. If a shrink occurs with the outer member, an appearance of the spoiler is discarded, and therefore, it is preferable to perform vibration welding in a condition that no shrink occurs.

Therefore, it is preferable that the weld rib be formed in the inner member before welded and fixed, and that the setting of a width of a part in which the weld rib after welded and fixed is in contact with a back face of the outer member be ½ or less of a thickness of the outer member. In other words, it is sufficient if a length of a bottom edge of the triangular shape of the cross section (a length of a part expressed as α of FIG. 4 (B)) is ½ or less of the thickness of the outer member of a part to be welded. It is preferable that the length of the bottom edge be ⅕ or less of the thickness of the outer member. In this manner, even if the weld rib formed in the inner member is welded with the outer member, an occurrence of a shrink on the surface of the outer member can be restrained while a sufficient welding strength is maintained.

In addition, it is preferable that the setting of a width obtained in the case where the weld rib after welded and fixed comes into contact with the back face of the outer member (a length of the bottom edge of the triangular shape of the cross section) be ⅓ or more of the thickness of the outer member of a part to be welded. In this manner, a sufficient welding strength can be obtained.

Further, a more preferred aspect of the sectional shape of the weld rib will be described.

As described previously, the weld rib in the present invention is characterized in that a cross section thereof is formed in a triangular or quadrangular shape, and the corners at both ends of the bottom edge each form an angle of 90 degrees or less, and it is preferable that a sum of the angles at both ends of the bottom edge be in the range of 90 degrees or more to 150 degrees or less. In this manner, falling down of the weld rib can be restrained, and a spoiler that is uniformly and firmly welded can be obtained.

Moreover, in the triangle or quadrangle of the cross section of the weld rib, it is preferable that a ratio of the bottom edge and the height (height/bottom edge) be in the range of ⅓ to ⅔. In this manner, falling down of the weld rib is restrained more significantly, and a spoiler welded uniformly and firmly can be obtained.

A material for the outer member and the inner member constituting the spoiler of the present invention is not limited in particular as long as it is a synthetic resin for which the vibration welding method can be carried out, and the conventional publicly known material can be utilized. As the material, for example, ABS, PP, and PA or the like can be preferably used. In addition, while the outer member and the inner member may be formed by any means, for example, it is preferable to form these two members by means of injection molding.

EMBODIMENTS

Embodiment 1

An outer member and an inner member shown in FIG. 1 were fabricated by means of an injection molding technique employing a polypropylene resin. A plurality of weld ribs were formed on two by two sites basis in the vertical direction of the inner member as shown in FIG. 3. A face on which the weld rib has been formed is a face that is inclined with respect to a pressurization direction at the time of vibration welding.

An inner member was formed so as to be just included in the inner face side of the outer member and so that a tip end of the weld rib comes into contact with a welded part of the outer member. In addition, the inner member and the outer member were allowed to vibrate at the amplitude of the order of 4 mm in the transverse direction.

The shape of the weld rib was formed to be triangular in cross section, as illustrated in FIG. 4 (A). Specifically, the weld rib was formed so that the height is 1.0 mm, the bottom edge is 1.5 mm, and two corners at both ends of the bottom edge respectively form angles of 90 degrees and 33.5 degrees. In addition, the thickness of the outer member at the welded part was defined as 3.5 mm.

Vibration welding was carried out by means of a publicly known vibration welding apparatus so that the outer member and the inner member come into contact with each other at a tip end part of the weld rib. Vibration welding was carried out in a condition that the amplitude is 4 mm, and the vibration frequency is 100 Hz.

After the weld rib has completely welded, the spoiler of the present invention was obtained by cooling and fixing the outer member and the inner member to each other while these two members are aligned with each other. The thus obtained spoiler was verified to be a spoiler in which the weld rib is uniformly welded, and the outer member and the inner member are welded and fixed to each other at a stable strength, the spoiler having an excellent welding quality of its whole product.

Embodiment 2

Figure 5:
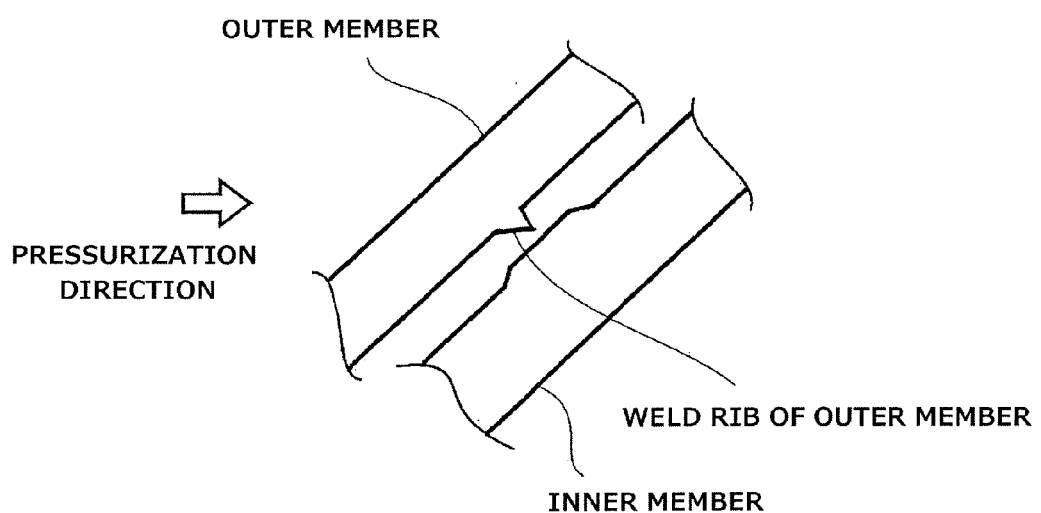
FIG. 5 is a view illustrating an example in which a weld rib is formed in an outer member.

As shown in FIG. 5, a spoiler was fabricated in a same manner as that in Example 1 except that a weld rib was formed in an outer member.

As is the case with Example 1, there could be obtained a spoiler in which the weld rib is uniformly welded, and the outer member and an inner member are welded and fixed to each other, the spoiler having an excellent welding quality of its whole product.

What is claimed is:

1. A spoiler structure comprising an inner member and an outer member, the inner member being welded and fixed to on an interior face side of the outer member by means of a vibration welding method, wherein the outer member and/or the inner member before being welded and fixed has a weld rib formed on a face that is inclined with respect to a pressurization direction at a time of vibration welding, a cross section of the weld rib is formed in a triangular shape, a bottom edge of the triangle weld rib is defined by two corners opposed to an apex as a part that comes into contact with a counterpart member, in a cross section of the weld rib, and in the weld rib, the two corners at both ends of the bottom edge each form an angle of 90 degrees or less.

2. The spoiler structure according to claim 1, wherein the weld rib is formed in the inner member before welded and fixed, and a width of a part in which the weld rib after welded and fixed is in contact with a back face of the outer member is ½ or less of a thickness of the outer member.

3. The spoiler structure according to claim 1, wherein the weld rib comes into linear contact with the counterpart member.

4. A spoiler structure comprising an inner member and an outer member, the inner member being welded and fixed to on an interior face side of the outer member by means of a vibration welding method, wherein the outer member and/or the inner member before being welded and fixed has a weld rib formed on a face that is inclined with respect to a pressurization direction at a time of vibration welding, the weld rib includes:

a tip end part that has a first contract area that contacts with a counterpart member at the initial time of welding; and a portion of the weld rib has a second contract area greater than the first contract area, so as to gradually increases a contact area between the weld rib and the counterpart member.

5. The spoiler structure according to claim 4, wherein the weld rib comes into linear contact with the counterpart member.

6. The spoiler structure according to claim 4, a cross section of the weld rib is formed in a triangular or quadrangular shape.

* * * * *